United States Patent [19] [11] 4,318,439
Hiroshima et al. [45] Mar. 9, 1982

[54] HOT STEEL CUTTING APPARATUS

[75] Inventors: Tatsuo Hiroshima, Nishinomiya; Takahide Sakamoto; Kenichi Matsui, both of Mino; Ichiroh Ohgaki, Suita, all of Japan

[73] Assignee: Sumitomo Metal Industries, Ltd., Osaka, Japan

[21] Appl. No.: 63,340

[22] Filed: Aug. 2, 1979

[30] Foreign Application Priority Data

Nov. 29, 1978 [JP] Japan .................. 53-147539

[51] Int. Cl.³ ........................... B22D 31/00
[52] U.S. Cl. .................. 164/154; 148/9 R; 164/263; 266/50; 266/51; 266/58; 266/92
[58] Field of Search .......... 266/48, 50, 51, 58, 266/78, 90, 92; 148/9 R; 164/154, 76, 263; 228/105; 219/124.21–124.4; 72/203

[56] References Cited

U.S. PATENT DOCUMENTS

| 3,020,034 | 2/1962 | Laycak et al. | 266/51 |
| 3,432,366 | 3/1969 | Lotz | 266/51 |
| 3,822,632 | 7/1974 | Chigiotti | 266/51 |
| 4,118,620 | 10/1978 | Wall, Jr. et al. | 219/124.33 |
| 4,131,490 | 12/1978 | Oishi et al. | 266/51 |
| 4,175,729 | 11/1979 | Karlsson | 266/51 |

FOREIGN PATENT DOCUMENTS

| 2349220 | 4/1975 | Fed. Rep. of Germany | 266/50 |
| 2711660 | 9/1978 | Fed. Rep. of Germany | 219/124.22 |
| 2902643 | 7/1979 | Fed. Rep. of Germany | 219/124.34 |
| 49-22302 | 6/1974 | Japan | 266/51 |
| 53-35423 | 4/1978 | Japan . | |
| 571355 | 9/1972 | U.S.S.R. | 219/124.22 |

Primary Examiner—Michael L. Lewis
Attorney, Agent, or Firm—Wenderoth, Lind & Ponack

[57] ABSTRACT

A cutting apparatus lights the surface of a moving hot steel material with lamps, locates any flaw with a video camera or the like, scarfs the surface of the steel material adjacent the flaw with a scarfing torch, measures the depth of the flaw with an eddy current detecting probe or the like, estimates accurately the loss of length due to conditioning size and depth of the flaw with a computer, and cuts the steel material in a predetermined length plus the accurately estimated length corresponding to the loss of length due to conditioning.

2 Claims, 2 Drawing Figures

HOT STEEL CUTTING APPARATUS

BACKGROUND OF THE INVENTION

The present invention relates to a hot steel cutting apparatus and, more particularly, to an apparatus for continuously detecting flaws in the hot steel material and cutting the material in a predetermined length including an accurately estimated length loss due to conditioning.

A hot continuous cast steel piece (approximately 800° C.) produced by a continuous casting apparatus is cut by a gas flame into slabs of a length suitable for the succeeding step, and, after being cooled, is subjected to cold inspection and cold conditioning. The conditioned slabs are heated to high temperatures of about 1200° C. in a heating furnace and rolled by a plate mill or a hot rolling mill into products.

The thermal waste caused by the fact that the produced slabs at nearly 800° C. are cooled to room temperature and again heated to about 1200° C. has heretofore been unavoidable because there was no effective method for flaw inspection and partial conditioning of hot steel.

The slabs have heretofore been cut by a gas flame into a predetermined length including a uniform length to allow for loss due to conditioning in order to obtain the required dimensions of the hot rolled steel plates on the assumption that all the slabs required cold conditioning. Even in a slab free of flaws, after it has been processed into a hot rolled plate, since the length uniformly preestimated as loss due to conditioning has been cut away and discarded, the yield has been the same as in slabs having flaws. Such a wasteful slab length determination has been inevitable because a method for flaw inspection of hot steel has not yet been developed. In other words, inability to obtain an accurate estimation of the loss of length due to conditioning has been a major factor preventing an increase in the yield.

SUMMARY OF THE INVENTION

Accordingly, an object of the present invention is to provide a cutting apparatus capable of increasing the yield of steel pieces cut from continuous cast steel, blooming rolled steel pieces and the like.

By the use of the cutting apparatus according to the present invention, it is possible to inspect for flaws in hot steel material such as cast pieces produced by a continuous casting apparatus and blooming rolled steel pieces before gas cutting, accurately to estimate the loss of length due to conditioning from the frequency and dimensions of the flaws, determine the cutting length by adding the accurately estimated loss of length due to the conditions to the length of the required product, and to cut the steel material, thereby increasing the yield since the steel material free of flaws can be cut without taking the loss of length due to conditioning into account.

BRIEF DESCRIPTION OF THE DRAWINGS

The invention will be better understood from the following description taken in connection with the accompanying drawings in which.

DESCRIPTION OF THE PREFERRED EMBODIMENTS

Figure 1:
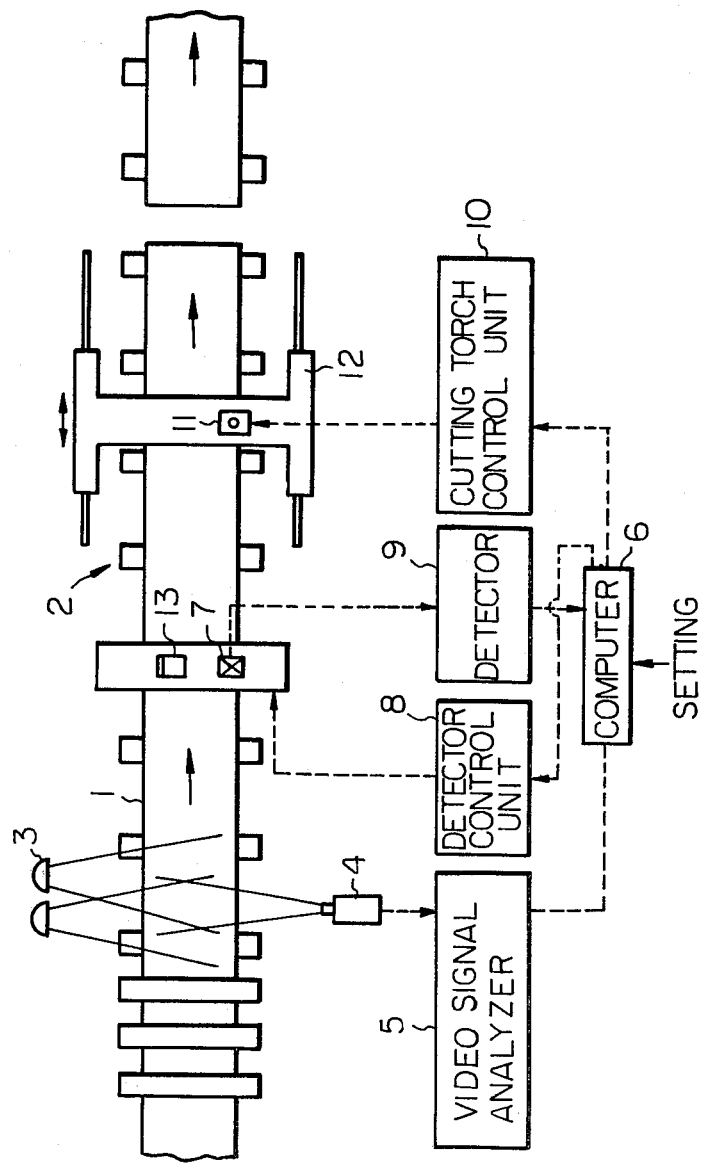
FIG. 1 is a schematic diagram of a continuous casting apparatus in which a cutting apparatus according to the present invention is provided on the exit end thereof.

With reference now to the drawings and more particularly to FIG. 1, there is illustrated an embodiment of the present invention in which a cutting apparatus according to the present invention is used on the exit end of a conventional continuous casting apparatus. A continuously cast hot steel piece 1 (hereinafter referred to a cast steel piece) is carried on a table 2 at a speed of, for example, approximately 1 meter/min.

The cast steel piece 1 is lighted by high-powered lamps 3 and televised by an industrial television camera 4. A video signal from the camera 4 is applied to a video signal analyzer 5 which inspects for the presence and size of any flaw, and, when a flaw is present, transmits data concerning the flaw to a computer 6.

The computer 6 computes from the casting speed (a speed at which the cast steel piece 1 is carried) the period of time required for the detected flaw on the cast steel piece 1 to move from a flaw detection position at which the camera 4 is disposed to a flaw depth measurement position at which a detecting probe 7 is disposed, and applies a measurement timing signal to a detector control unit 8.

The detecting probe 7 performs widthwise scanning of the cast steel piece 1 in response to the measurement timing signal and applies a detection signal to a detector 9. The detector 9 determines the depth of the flaw from the detection signal and supplies a flaw depth signal to the computer 6. A scarfing torch 13 may be provided for smoothing the surface of the cast steel piece 1 to be inspected adjacent the flaw before the flaw detection.

The computer 6 estimates accurately the loss of length due to conditioning according to the information on the position and the size of the flaw from the video signal analyzer 5, the information on the depth of the flaw from the detector 9, and the predetermined information from the continuous casting apparatus, determines the length of the cast steel piece to be cut including the length corresponding the loss due to conditioning, and applies a cutting timing signal to a cutting torch control unit 10 which, in response to the cutting timing signal, controls the operation of a cutting torch 11.

The term "the loss of length due to conditioning" is used herein to mean the length of the cast steel piece corresponding to the weight of the steel to be lost during the conditioning of a cut cast steel piece, calculated according to the required dimensions of the cast steel piece.

The cutting torch 11 is mounted on a truck 12 and moved widthwise of the cast steel piece 1. The truck 12 is moved longitudinally of the cast steel piece 1 in synchronization with the speed of the cast steel piece 1 on the table 2.

From among various means for detecting surface flaws of a hot steel material, the known picture signal analyzing method by an industrial television camera is utilized in the present invention. In this method, light which is so intense that the light radiated from the hot steel material can be neglected is directed onto the surface of the steel material to cause shadows thereon due to depressions and rises of the surface flaws, and the dark and light portions thereof are televised by the industrial television camera to detect the flaws. Analysis of the picture signals obtained by the television camera reveals the position and the size of the flaws.

One of the means for analysis of the video signal is binarizing the intensity of the video signal in comparison with a reference level, or obtaining differentiation or scanning line difference of the picture signal and then binarizing same in comparison to the reference level, and thereafter calculating the position and the size of the flaw. These operations can be easily performed by the computer.

In the case of the cast steel piece, it is true that shadows caused by oscillation marks can also occur. However, since the oscillation marks appear in a fixed direction (namely widthwise of the cast steel piece), the problems in signal analysis caused by the oscillation marks can be avoided by giving special attention to the angle of lighting or by neglecting the shadows in the same direction as the oscillation marks in the signal analysis. In fact, since the flaws in the cast steel piece are mostly longitudinal cracks which are perpendicular to the oscillation marks, there is little possibility that any flaw will be overlooked even if the shadows in the same direction as the oscillation marks are not identified as flaws.

A common industrial television camera can be used satisfactorily for inspection of the continuous cast steel piece since the speed of movement thereof is low and in general on the order of 0.4 to 1.5 meter/minute. However, for inspection of a rolled steel piece such as a bloom, billet, slab and the like, the speed of movement of which is relatively high, on the order of 3 to 10 meter/second, a common industrial television camera cannot be used because it cannot provide clear images when used for televising such an object moving at a relatively high speed.

The applicant has developed a shutter-type video camera which is capable of providing clear still images of a moving luminous object such as a red-hot steel piece on a rolling line, as disclosed in Japanese Patent Public Disclosure No. 35423/78. The shutter-type video camera can be used to provide sufficiently clear images of the steel pieces such as blooms mentioned above.

The shutter-type video camera comprises a synchronizing signal generator for applying a vertical synchronizing signal to the video camera, a shutter synchronizing circuit for receiving the vertical synchronizing signal from said synchronizing signal generator and for applying a drive command signal in synchronization with the vertical synchronizing signal received immediately after an image taking command signal, a shutter delay circuit for delaying said drive command signal for a predetermined length of time, and a shutter drive circuit for driving the shutter upon receipt of the delayed drive command signal.

Figure 2:
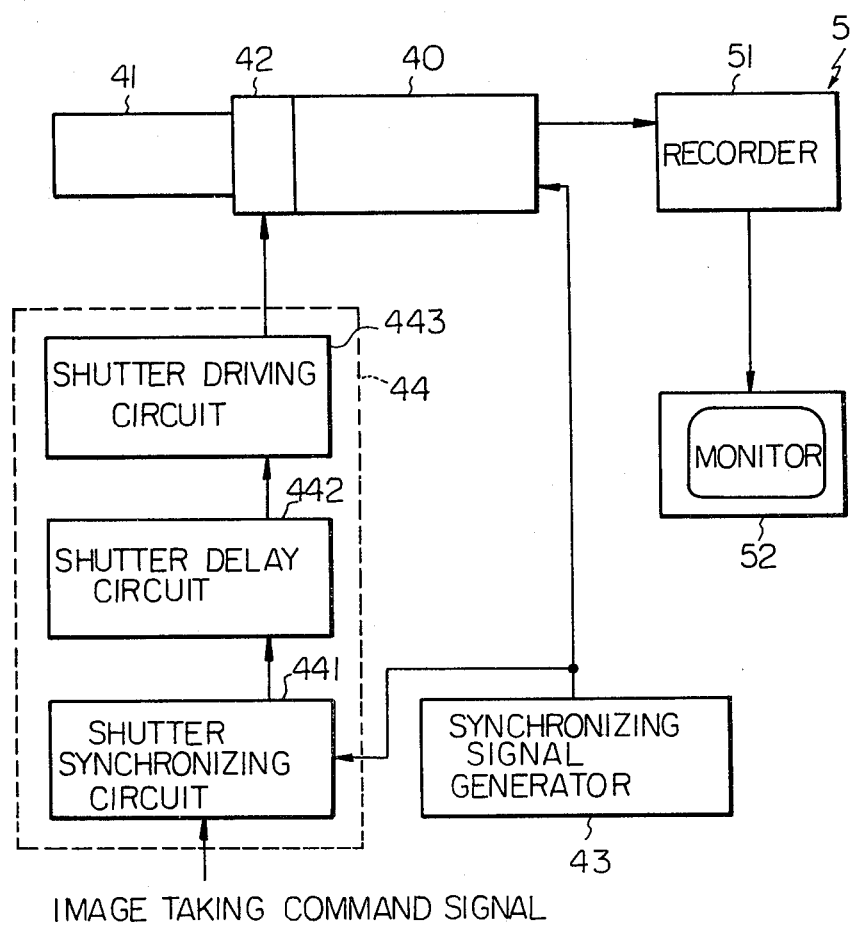
FIG. 2 is a schematic block diagram of an example of a shutter-type video camera for use with the cutting apparatus according to the present invention.

An embodiment of the video camera will now be described briefly with reference to FIG. 2 in which reference numeral 40 denotes a video camera containing an image pick up tube such, for example, as a vidicon. A shutter such as an electric shutter 42 is provided between the video camera 40 and a lens system 41 thereof. A video signal from the video camera 40 is applied to and recorded by a recorder 51 which corresponds to the picture signal analyzer of FIG. 1, and is read out from the recorder 51 and displayed on a monitor 52 when necessary. The video camera 40 further comprises a synchronizing signal generator 43 and a shutter control unit 44. The synchronizing signal generator 43 applies a vertical synchronizing signal to the video camera for synchronization of the vertical scanning of the video camera. The shutter control unit 44 comprises a shutter synchronizing circuit 441, a shutter driving circuit 443 for supplying a driving current to, for example, a driving solenoid of the electric shutter 42. The shutter synchronizing circuit 441 receives the vertical synchronizing signal from the synchronizing signal generator 43 and, upon receiving an image taking command signal $S_I$, applies a shutter drive command signal to the shutter delay circuit 442 in synchronization with the succeeding vertical synchronizing signal. The drive command signal delayed by the shutter drive circuit 442 is applied to the shutter drive circuit 443 which supplies the drive current to the driving solenoid of the electric shutter 42. If $T_S$ is the mechanical delay of the electric shutter 42 from reception of the driving current to the opening of the shutter, the shutter 42 opens after the time $T_S$ from supplying of the driving current and closes again after a predetermined time, for example, 1/100 second.

The video camera of the construction described above is set and operated as described below. A rising characteristic for the pulse light input to the vidicon used in the video camera 40 and variation of the brightness level of the picture signal due to residual image characteristic are first determined. In the case where it is preferred that a vertical synchronizing pulse $S_A$ be positioned after a time $T_I$ from the rise, the delay time of the shutter delay circuit 442 is determined so as to satisfy the condition expressed by the following formula:

$$NT = T_I + T_S + T_D$$

where
N: integer
T: time interval of the vertical synchronizing pulse
$T_D$: delay time of the shutter delay circuit 442

In a stand-by condition where no image taking command signal is present, the electric shutter 42 is kept closed and the video camera 40 supplies black level signals including the synchronizing signal. In this condition, when the image taking command signal $S_I$ is applied, the shutter synchronizing circuit, in synchronization with the succeeding vertical synchronizing signal, applies the shutter drive command signal $S_S$ to the shutter delay circuit 442. A shutter drive command signal $S_S$ delayed for the time period $T_D$ by the shutter delay circuit 442 is applied to the shutter driving circuit 443 which supplies the driving current to the solenoid of the electric shutter in synchronization with the delayed shutter drive command signal $S'_S$. The electric shutter 42 opens at a time $t_1$ after its intrinsic mechanical delay time $T_S$ and closes at a time $t_2$ after the period of time determined by the shutter speed. By the input of a pulse of light during the time the shutter is open for the period of time $t_2 - t_1$, the variation of the picture signal due to the rising characteristic of the vidicon and the residual image characteristic is increased substantially linearly, while the level of the picture signal of a field beginning at the synchronizing signal $S_A$ delayed for the time length $T_I$ from the time $t_1$ is substantially constant.

As described above, the vertical synchronizing signal and the output signal of the video camera are always kept in a constant time relation such that the level of the picture signal of a field is substantially constant. By continuously applying only a field beginning with the vertical synchronizing signal $S_A$, namely a field including the output peak from the recorder 51, it is made possible to continuously display even and uniform still images on the monitor 52.

The electric shutter 42 may be a mechanism in which a disk having a number of windows is rotated in front of the camera by an electric motor.

While it is possible to find out the position and the size of the flaw by the use of the video camera of the construction described above, it is difficult to find out the depth of the flaw and it is also impossible to accurately estimate the loss of length due to conditioning. Therefore, there has been a demand for method for a measurement of the depth of the flaw using the detector 9.

This measurement method can utilize the technical art described in the applicant's Japanese Utility Model Application No. 153158/77 (disclosed by the Japanese Utility Model Public Disclosure No. 79181/79) under the title "Steel Surface Defect Inspection Apparatus". This inspection apparatus is characterized by the provision of one or more torches forwardly of the detector probe, for scarfing the surface to be inspected by the detector probe. By the use of this inspection apparatus, it is possible to inspect steel materials with a rough surface such as cast steel pieces having oscillation marks thereon and, if an ultrasonic probe or an eddy current coil is used as the probe, it is possible to detect the depth of the flaw.

As described above, while the use of this inspection apparatus makes it possible to detect the depth of the flaw, an unduly wide or frequent application of it will result in too wide a scarfing loss from the torch and a reduction in the yield. Accordingly, it is preferred to apply this inspection apparatus only to the flaws found by the industrial television camera and, in particular, to measure only the depths of the flaws, to thereby increase the yield of the entire apparatus.

The steel material can be cut in a length including the accurate length due to loss of length due to conditioning after having been conditioned adjacent the flaws by the scarfing torch used in this inspection apparatus.

While the present invention has been described hereinabove with respect to an example in which the cutting apparatus according to the present invention is used to cut cast steel pieces produced by a continuous casting apparatus, it will be obvious that the apparatus according to the present invention may be used for steel pieces such as blooms or billets produced by the continuous casting apparatus and slabs, blooms or billets produced by a rolling mill.

As will be obvious from the foregoing description, the steel cutting apparatus according to the present invention is capable of cutting hot steel easily and accurately and is, accordingly, very effective in increasing the yield.

While we have shown and described specific embodiments of the present invention, it will be understood that these embodiments are merely for the purpose of illustration and description and that various other forms may be devised within the scope of the invention, as defined in the appended claim.

We claim:

1. An apparatus comprising means for producing a continuous length of hot steel material and means for cutting said hot steel material into slabs, said cutting means having:

means for conveying along a conveying path a continuous length of hot steel material having a surface which may have flaws therein at a particular positions and with a size coplanar with said surface and with a depth;

lamps directed toward said surface of the hot steel material for lighting an area of the surface of the hot steel material;

an industrial television camera directed toward the lighted area of the steel material for televising the lighted area and outputting a video signal representing the image of the area;

a video signal analyzer connected to said camera for analyzing the video signal from said camera and determining therefrom the position and the size of a flaw in the surface of the steel material;

a flaw depth detector and scarfing means spaced along said conveying path from said lamps in the direction of conveying of the steel material and having an inspection probe for detecting the depth of the detected flaw and further having scarfing means for scarfing the surface of the steel material which has been televised with a scarfing torch adjacent any flaws which have been detected;

a cutter spaced along said path from said flaw depth detector and scarfing means in the direction of conveying of the steel material for cutting the moving steel material in a direction transverse to the direction of conveying; and a computer connected to said video signal analyzer and to said inspection probe for receiving the outputs thereof and determining therefrom the position, area and depth of a flaw and for accurately estimating therefrom the loss of length of steel material due to such a flaw during subsequent conditioning of the steel material and adding the thus estimated length to a predetermined length of steel material to form a desired length needed to make a desired product and outputting a timing signal, said computer being connected to said cutter for supplying said timing signal to said cutter to cause said cutter to cut the desired length of said steel material.

2. A hot steel cutting apparatus as claimed in claim 1 in which said computer further comprises means for producing an actuating signal for said flaw depth detector and scarfing means when a flaw is found by said video signal analyzer, said actuating signal producing means being connected to said flaw depth detector and scarfing means for actuating said flaw depth detector and scarfing means in response to the production of such an actuating signal.

* * * * *